Patented Dec. 15, 1942

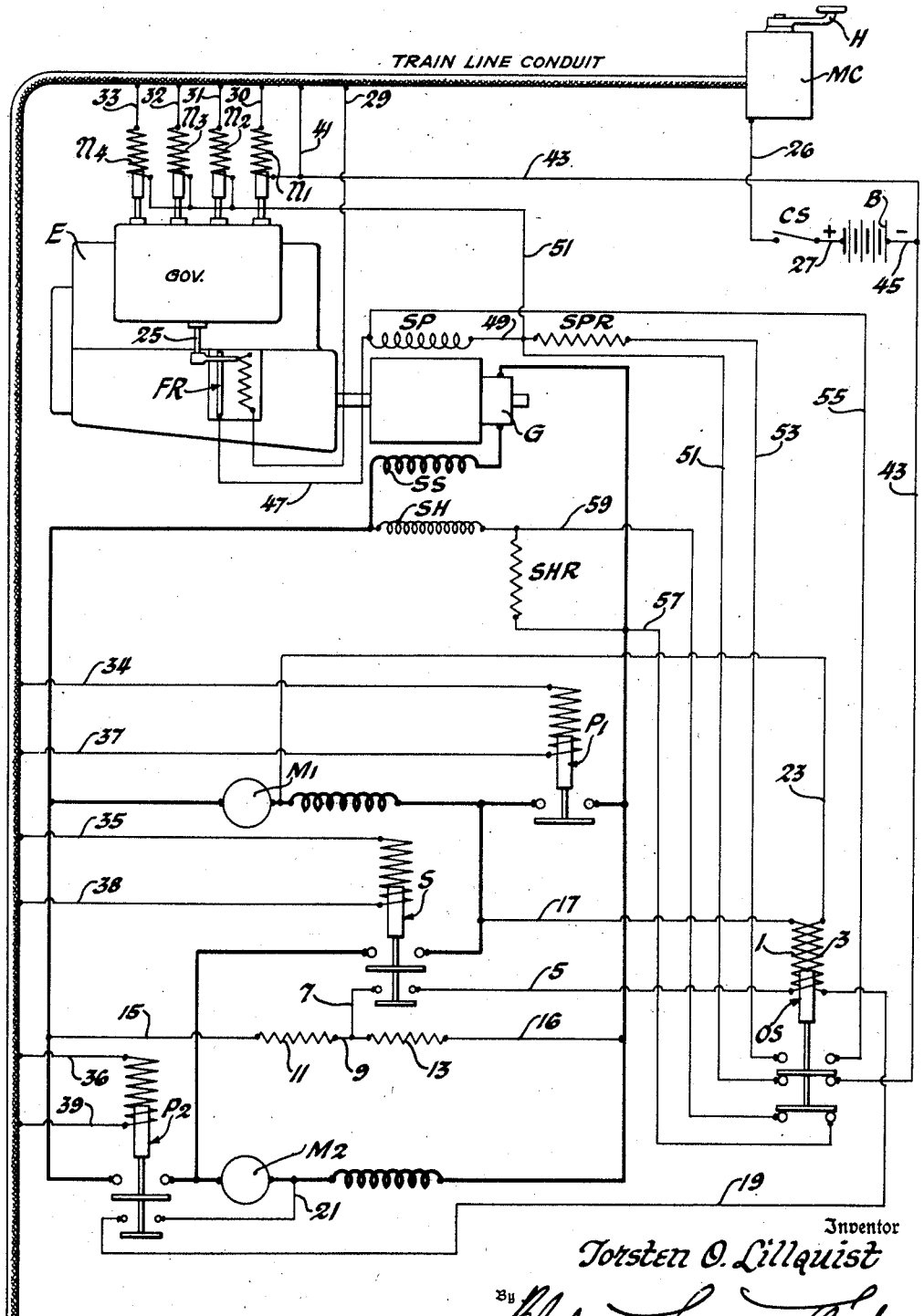

2,304,937

UNITED STATES PATENT OFFICE 2,304,937

GENERATING ELECTRIC DRIVE AND CONTROL SYSTEM

Torsten O. Lillquist, Clarendon Hills, Ill., assignor to General Motors Corporation, Detroit, Mich., a corporation of Delaware Application March 12, 1942, Serial No. 434,416

3 Claims. (Cl. 290—17)

The present invention relates generally to generating electric drive and control systems of the multi-driving motor type and more particularly relates to protective control means to prevent overspeeding of any one of the driving motors.

In systems of the above described type where series traction motors are used it is the usual practice to connect the motors in series to obtain high torque at low speed and then to connect the motors in series-parallel and parallel relation to obtain higher speed and reduced torque characteristics therefrom. Where each motor drives separate driving means such as one or more separate wheels of a vehicle or a separate propeller of a ship, any sudden reduction in the external load on any one motor caused by slippage of a wheel on the road or rail, or by movement of a propeller out of the water, will cause overspeeding of the particular motor and driving means, which if not checked will cause damage of the driving means.

Due to the higher values of torque delivered by the motors when connected in series there is greater liability of overspeeding of any one of the motors and therefore it is the usual practice to provide protective means responsive to speed differences between the motors when they are connected in series to prevent overspeeding of any one motor. With the series-parallel and parallel motor circuit connections where the generator current divides equally between groups of motors or each motor respectively there is less liability of overspeeding of any one motor, but under certain operating conditions it takes place, especially at high speeds with a generating electric traction vehicle under certain rail or road conditions. Also with this type of vehicle excessive current surges are suddenly supplied by the generator to the motors upon a change of the motor circuit relations at improper speed and load values of the motors which at times causes wheel slip, and means must, therefore, be provided to prevent overspeeding of any motor for each of the particular motor circuit relations.

The principal object of the present invention, therefore, is the provision of a simple electroresponsive protective control means, which acts instantly in response to unequal electrical conditions existing between the motors when connected in any series or parallel relation with other motors, and a generator, which is driven by a prime mover, to cause a simultaneous reduction in speed, load and output of the prime mover and generator whereby overspeeding of any one motor with respect to the others is checked at the inception thereof.

The combination of drive and control means by which the above object is accomplished will be better understood by referring to the following detailed description thereof and the single accompanying drawing illustrating diagrammatically a combination of drive and control means which is particularly adapted for Diesel electric locomotives; however, it will be apparent that the combination may be modified for other types of driving systems.

Referring to the drawing, the locomotive driving system shown includes a Diesel engine E, a compound electric generator G the armature of which is directly connected to and driven by the engine, and electric traction motors M1 and M2 of the series type, each serving to drive individual axles and wheels of the locomotive, not shown, by any well known means. The power connections extending between the generator and motors are shown in heavy lines and include switching means or series and parallel contactors S, P1 and P2 for connecting the motors in series or parallel circuit relation with the generator.

The control means for the drive system comprises a manually operable master controller shown generally at MC and electroresponsive automatic control means shown generally at OS. The controller MC serves to control operation of the switching means for connecting the motors in series or parallel circuit relation with the generator and also to control engine and generator speed and power output regulating means, to be described, for the generator at preselected values suitable for each of the motor circuit relations. Operation of the switching means causes the automatic control means OS to be connected in either of these motor circuit relations in such manner that it responds and acts instantly when any slight differences in electrical conditions occur between the motors upon overspeeding of one of the motors to cause a reduction in the speed and power output of the engine and generator to a low value independently of the master controller, thereby checking any tendency of a motor to overspeed.

The switching means or contactors S, P1 and P2 shown are of the electromagnetically actuated type and each includes an actuating winding, pairs of fixed contacts and an armature having contacts fixed thereon movable into contact with the fixed contacts upon energization of the windings thereof from the normal open position in which they are shown. The larger or upper pair of fixed contacts of each contactor are connected to the power conductors so that upon energization of the winding and closure of the series contactor S or both parallel contactors P1 and P2 the motors will be connected in series or parallel relation with the generator. The smaller pair of fixed contacts and small armature contact on both the series contactor S and parallel contactor P2 are control contacts and serve to connect the automatic control means OS in each of the motor circuit relations so that it will respond and act upon any slight unbalance in electrical conditions between the motors caused by a slight overspeeding of either motor when they are connected in either a series or parallel relation with the generator.

The automatic control means OS, in the form shown, is a relay having two actuating windings 1 and 3, three pairs of fixed contacts and an armature having contacts fixed thereto, shown normally bridging the two lower pairs of fixed contacts and movable to an operative position where only the upper pair of contacts are bridged upon energization of either relay winding.

By means of the following connections between the relay winding 1 and the control contacts the winding will only be energized when there is an unbalance in the electrical conditions between the motors due to overspeeding of either when connected in series with the generator. One terminal of the relay winding 1 is connected by a conductor 5 to one control contact of the contactor S, the other control contact of which is connected by a conductor 7 to a conductor 9 connected between adjacent terminals of two resistors 11 and 13, each of equal resistance. The other terminals of these resistors are connected by separate conductors 15 and 16 to separate power conductors shown respectively connected to opposite generator armature terminals. The resistors 11 and 13 when connected in this manner serve as a potential divider. The other terminal of the relay winding 1 is connected by a conductor 17 to one of the power conductors shown connected to respective power contacts of the series contactor. With the above connection arrangement when the series contactor is closed the motors M1 and M2 will be connected in series with the generator and one terminal of the winding will be connected in equipotential relation with both generator armature terminals and the other winding terminal will be connected to a point between the motors which is at the same potential as long as the speed of each motor is the same, and no current will flow in the relay winding 1. If, however, one motor tends to overspeed, its back voltage will increase and the electrical conditions between the motors will become unbalanced and slight current will flow in the relay winding 1, thereby causing the relay armature to be attracted and moved upward to its operative position.

By means of the following connections the relay winding 3 will likewise only be energized when there is any slight unbalance in the electrical conditions between the motors due to overspeeding of one, when the motors are connected in parallel with the generator upon closure of both of the parallel contactors P1 and P2. One of the terminals of the relay winding 3 is connected by a conductor 19 to one of the fixed control contacts of the contactor P2, the other control contact of which is connected by a conductor 21 to a power conductor connecting the armature to the series field of the motor M2, and the other terminal of the relay winding 3 is connected directly by a conductor 23 to a power conductor connecting the armature to the series field of the motor M1. With the above described connections closure of the parallel contactors P1 and P2 connects the motors in parallel with the generator and the voltage applied across each is equal if the motors operate at the same speed. Closure of the contactor P2 also connects the winding 3 of the relay between the motors so that both terminals of this relay winding are at equipotential and no current will flow therein unless there is a slight tendency of one motor to overspeed. Any such overspeeding tendency of a motor causes an unbalance in the electrical conditions between the motors, and current will accordingly flow in the winding 3 of the relay and it will then likewise attract and move the relay armature upward to the operative position.

The following control connections between the relay contacts, master controller MC and the speed and output regulating means for the engine and generator, to be described, allow these means to be controlled in a normal manner by the master controller when there is no unbalance in the electrical conditions between the motors and permit the relay to operate upon any slight unbalance in these electrical conditions to automatically cause the speed, load and output of the engine to be instantly reduced, thereby instantly restoring the electrical and speed balance and checking overspeeding of either motor.

The speed and output regulating means for the engine and generator includes an engine driven governor GOV and generator excitation regulating means comprising a series generator field SS, a shunt field SH, a shunt field resistor SHR, and a separately excited field SP and circuit including a rheostat FR and a discharge resistor SPR.

The governor GOV is of a conventional engine driven type having a sleeve 25 movable in response to variations in speed of the engine and operatively connected to the engine fuel regulating means, not shown, and also to the field rheostat FR to cause operation of the engine and generator at constant values of speed, load and output. The governor is likewise provided with conventional speed setting means, not shown, for varying the speed response of the governor. The speed setting means is connected by any well known linkage, not shown, to electromagnetic actuating means or devices shown at $n1$ to $n4$, whereby the governor speed setting means may be set to cause operation of the engine and generator by the governor at any one of a plurality of preselected values of speed, load and output suitable for either a series or parallel motor circuit connection with the generator. The linkage used is such that energization and operation of the electromagnetic means only causes the engine and generator to operate at idle speed and low load and output. Energization and operation of the electromagnetic means $n1$ to $n4$ in various combinations causes operation of the engine and generator at higher values of speed, load and output suitable for the series and parallel motor circuit relations by means of the following energizing and control connections interconnecting the series and parallel contactor windings, and separately excited generator field winding with the manually operable master controller MC and automatic control means OS.

The controller MC is of a well known sequence type having cooperating fixed and movable contacts, not shown, the movable contacts being movable to a number of control positions by a handle shown at H. The movable control contacts are electrically connected in any well known manner to a conductor 26 shown connected to one terminal of a control switch CS, the other terminal of which is connected to the positive terminal of the battery B by a conductor 27. Train line conductors, not shown, but included in a train line conduit shown on the drawing, are connected to the fixed controller contacts. Branch line conductors 29 to 36 are connected respectively to one terminal of the field rheostat FR and each of the upper terminals of the windings of means $n1$ to $n4$ and contactors S, P1 and P2. A negative train line conductor, not shown, is also contained in the train line conduit and conductors 37 to 39 are connected from the lower winding terminals of the contactors S, P1 and P2 with this negative train line conductor. A conductor 41 is also connected between this negative train line conductor and a conductor 43 interconnecting the lower winding terminal of the winding of the electromagnetic device $n1$ with one of the control fixed contacts of the relay. A conductor 45 is connected between the conductor 43 and the negative terminal of the battery.

It will be noted that the other terminal of the field rheostat FR is connected by a conductor 47 to one terminal of the separately excited generator field SP. The controller contacts are so arranged that only the winding of the electromagnetic means $n1$ is connected to the positive battery terminal for one position of the movable controller contact; for other positions of the controller movable contact one terminal of the separately excited field winding SP of the generator and the windings of the electromagnetic means $n1$ to $n4$ are connected in various combinations with either the winding of the series contactor S or the windings of the parallel contactors P1 and P2 to the positive battery terminal. The return connection from each of these means to the negative battery terminal to cause energization thereof will now be described.

The other terminal of the separately excited field winding SP is connected by a conductor 49 to one terminal of the discharge resistor SPR and also to a conductor 51 which serves as a common negative return conductor for this generator field winding and the windings of the devices $n1$ to $n3$, as one end of the conductor 51 is shown connected between the lower terminals of the windings of devices $n1$ to $n3$ and the other end is connected to the central fixed relay contact. With the central fixed relay contacts normally bridged as shown, the conductor 51 is connected to conductors 43 and 45 and therefore to the negative battery terminal, but upon upward movement of the relay armature to the operative position this return circuit is broken and the windings of the means $n1$ to $n3$ and the separately excited field SP are disconnected from the negative battery and are accordingly automatically de-energized, thereby causing the speed and power output of the generator to be reduced to a low value as only the winding $n4$ of the device may then be energized to cause operation of the engine and generator at idle speed and low output only.

The discharge resistor SPR serves to absorb the induced voltage upon interruption of the current in the separately excited field winding SP as its other terminal is connected by a conductor 53 to one of the upper fixed relay contacts, the other contact being connected by a conductor 55 to the conductor 47 connected between the field rheostat FR and separately excited winding SP. With this connection arrangement the discharge resistor is open when the upper pair of relay contacts are opened and the contact bridged to permit energization of the field SP. The discharge resistor SPR, however, is connected directly across this field when the relay armature moves to its operative position where the upper pair of relay contacts are bridged and the central pair of contacts are opened simultaneously to cause de-energization of the field winding.

The current in both the shunt and series fields SH and SS will be reduced by de-energization of the separately excited field winding and the current in the shunt field is further reduced by insertion of the resistor SHR of high resistance in series therewith by means of the following circuit arrangement upon operation of the relay, thereby reducing the output of the generator to substantially zero. The shunt field winding SH is connected in long shunt relation with the armature, one terminal being connected to one terminal of the series field SS and the other terminal being connected by a conductor 57 to one terminal of the resistor SHR and one of the lower fixed relay contacts. The conductor 57 is likewise connected, as shown, to a power conductor connected to a generator armature terminal. The other lower fixed relay contact is connected to the opposite terminal of the resistor by a conductor 59. With this connection arrangement the resistor SHR is normally shunted when the lower pair of relay contacts are bridged but is automatically connected in series with the shunt field winding of the generator when these contacts are opened by upward movement of the relay armature to the operative position. This causes a further reduction in the generator output. The output of the generator with the separately excited field de-energized and the high resistance resistor SHR in series with the shunt field SH is substantially zero upon operation of the relay.

With the combination described above it will be apparent that the manually operable controller normally controls joint operation of the engine and generator at preselected values of speed, load and output and also the switching means for connecting the motors in series and parallel and for connecting one or the other of the windings of the automatic means so that it will respond to slightly unbalanced electrical conditions between the motors when connected in either a series or parallel relation upon overspeeding of one motor and will act instantaneously to automatically cause the speed, load and output of the engine and generator to be reduced to a low value, thereby checking overspeeding of a motor promptly.

The combination disclosed is effective for instantly checking slight overspeeding between motors of a pair when connected in series or parallel circuit relation upon a sudden decrease in load on either motor due to slippage of a wheel driven thereby or upon wheel slippage caused by a sudden increase in current applied to the motors upon a change in the motor circuit relations.

I claim:

1. In a generating electric drive and control system comprising an engine, a generator driven thereby, a potential divider connected across said generator, means for varying the speed and output of the engine and generator between minimum and maximum values, a pair of driving motors, power connections between the generator and motors, electroresponsive control means for rendering a portion of said speed and output regulating means inoperative to prevent operation of the engine and generator at all values of output above the minimum value, electrical connections extending between said electroresponsive means, said potential divider, and said power connections, switching means connected in said power connections and electrical connections, said switching means being operable to connect the motors in series or parallel circuit relations and to connect a portion of said electroresponsive means in each of said circuit relations, that portion of the electroresponsive control means connected in the series circuit relation being connected between the motors and the potential divider, and that portion connected in the parallel circuit relation being connected between the motors so that both portions of said electroresponsive control means are rendered responsive only to any unbalance in the electrical conditions between the motors due to any unbalance in speed therebetween to cause the balance to be restored by reducing the power supplied to the motors from the engine and generator.

2. In a drive and control system for a vehicle having a prime mover generator power plant, output varying means therefor, a pair of motors driving individual traction wheels of the vehicle, power connections between the generator and motors, series and parallel switching means included in said connections for connecting the motors in series or parallel relation with the power plant generator, a manually operable controller for controlling jointly said output varying means and said series and parallel motor connecting means, electrically operated control means for preventing operation of said output varying means to limit the output of the power plant to a minimum value, said control means having two operating windings, each of said windings being connected in a separate circuit, one circuit including one of said windings, a potential divider, and circuit closing means, said potential divider being connected between the generator terminals and to said circuit closing means, said winding being connected between the circuit closing means and a power connection between the motors, said circuit closing means being operable by the series switching means, another circuit comprising the other winding and a second circuit closing means, said second circuit closing means being operable by the parallel switching means, said second circuit being connected directly between the motors, closure of one of said circuits permitting energization of one winding only upon an unbalance in electrical conditions between the motors caused by slight overspeeding of either motor, energization of either winding causing operation of the electrical control means and an instantaneous reduction in power supplied to the motors to restore the speed and electrical balance between the motors.

3. In a drive and control system for a vehicle comprising an engine, an electrical generator driven thereby, means for regulating the output of the engine and generator, a pair of series traction motors driving individual vehicle wheels, a pair of parallel switches connected between each motor and the generator operable simultaneously to connect both motors in parallel with the generator, a series switch connected between the motors and operable for connecting the motors in series with the generator, a pair of identical resistors connected in series across the generator, manual means for controlling the regulating means and series and parallel switches, electrically operated control means for independently controlling a portion of said regulating means to cause operation of the engine and generator at low output only, said electrically operated means having two operating windings, separate control circuits for each of said windings, one control circuit including circuit closing means operable by said series switch for connecting one of said windings between the resistors and motors, the other control circuit including circuit closing means operable by a parallel switch for connecting the other winding between the common field and armature connection of both motors, closure of either of the control circuits permitting one of the windings of the electrically operated control means to be energized only when unbalanced electrical conditions occur between the motors due to a slight overspeeding of one motor, said energization of a control circuit causing the operation of the electrical control means to restore the electrical and speed balance between the motors.

TORSTEN O. LILLQUIST.